Figure 1:
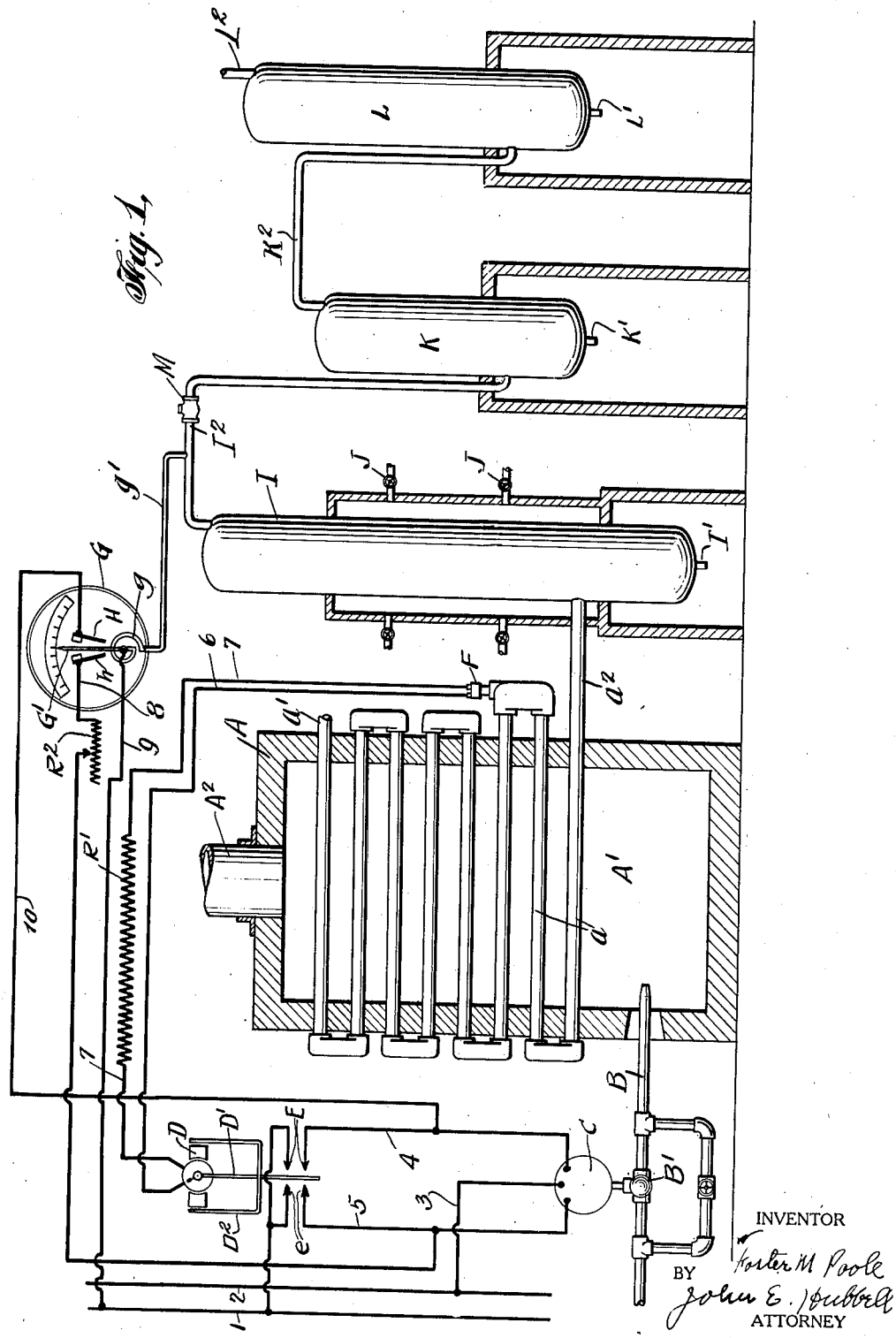

Jan. 25, 1927. 1,615,478
F. M. POOLE
FLUID HEATER CONTROL
Filed July 6, 1925 2 Sheets-Sheet 1

Jan. 25, 1927.

F. M. POOLE 1,615,478

FLUID HEATER CONTROL

Filed July 6, 1925

2 Sheets-Sheet 2

INVENTOR
Foster M. Poole
BY
John E. Hubbell
ATTORNEY

Patented Jan. 25, 1927.

1,615,478

UNITED STATES PATENT OFFICE.

FOSTER MALIC POOLE, OF TULSA, OKLAHOMA, ASSIGNOR TO THE BROWN INSTRUMENT COMPANY, OF PHILADELPHIA, PENNSYLVANIA, A CORPORATION OF PENNSYLVANIA.

FLUID-HEATER CONTROL.

Application filed July 6, 1925. Serial No. 41,900.

The general object of the present invention is to provide improved apparatus for controlling the operation of fluid heaters, and is characterized by the automatic control of the rate of heat absorption by the fluid passing through the heater in joint response to the temperature and pressure of the fluid heated. The invention was primarily devised and is especially adapted for, though not necessarily restricted to, use in controlling the supply of heat to an oil preheater which forms a part of a petroleum refining system, and in which it is desireable to heat the oil to a predetermined temperature so long as the pressure of the oil does not vary beyond the limits of a certain predetermined range, but when the oil pressure falls below or rises above said range, more or less heat should be provided than is required to heat the oil to said predetermined temperature. The fluctuations in the oil pressure thus to be compensated for depend upon such matters as atmospheric conditions, the source or character of the oil heated, and the amount of oil vapors taken out of the circulating system.

In the preferred practical mode of carrying out the present invention in connection with oil refining apparatus of the character referred to, a heater regulating device, such as a fuel valve, is adjusted to regulate the rate at which heat is supplied to the heater, by control apparatus comprising a galvanometer connected to a thermocouple subjected to the temperature of the oil leaving the heater, and also comprising a pressure gage responsive to the pressure of the oil at some suitable point in the oil refining system.

The galvanometer and pressure gage may be arranged to jointly control the heater regulating device in different ways. For example, the control mechanism may be so arranged that while the oil pressure transmitted to the pressure gage is within a certain normal pressure range, the valve or other regulating device will be subjected to the exclusive control of the galvanometer and will be adjusted by the latter as required to maintain an approximately constant oil temperature at the heater outlet, but, when the oil pressure falls below or rises above the limits of the said pressure range, the pressure gage will assume control of the heater regulating device and adjust the latter to increase or decrease the supply of heat to the heater regardless of the temperature then indicated by the galvanometer. In another mode of utilizing the galvanometer and pressure gage to jointly control the heater regulator, the galvanometer is at all times in direct control of the heater regulator and tends to maintain a constant oil temperature at the heater outlet while the oil pressure is within the normal range of pressure variation; but when the oil pressure falls below said range, the pressure gage makes a change in the galvanometer connections which in effect changes the constant of the galvanometer so that the latter tends to maintain an oil temperature at the heater outlet substantially higher than said predetermined temperature, and when the oil pressure exceeds such pressure range, the pressure gage makes another change in the galvanometer connections which in effect changes the constant of the galvanometer, so that the latter then adjusts the heater regulator as would be required for the maintenance of an oil temperature at the heater outlet appreciably lower than the normal predetermined outlet temperature.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of the invention.

Figure 2:
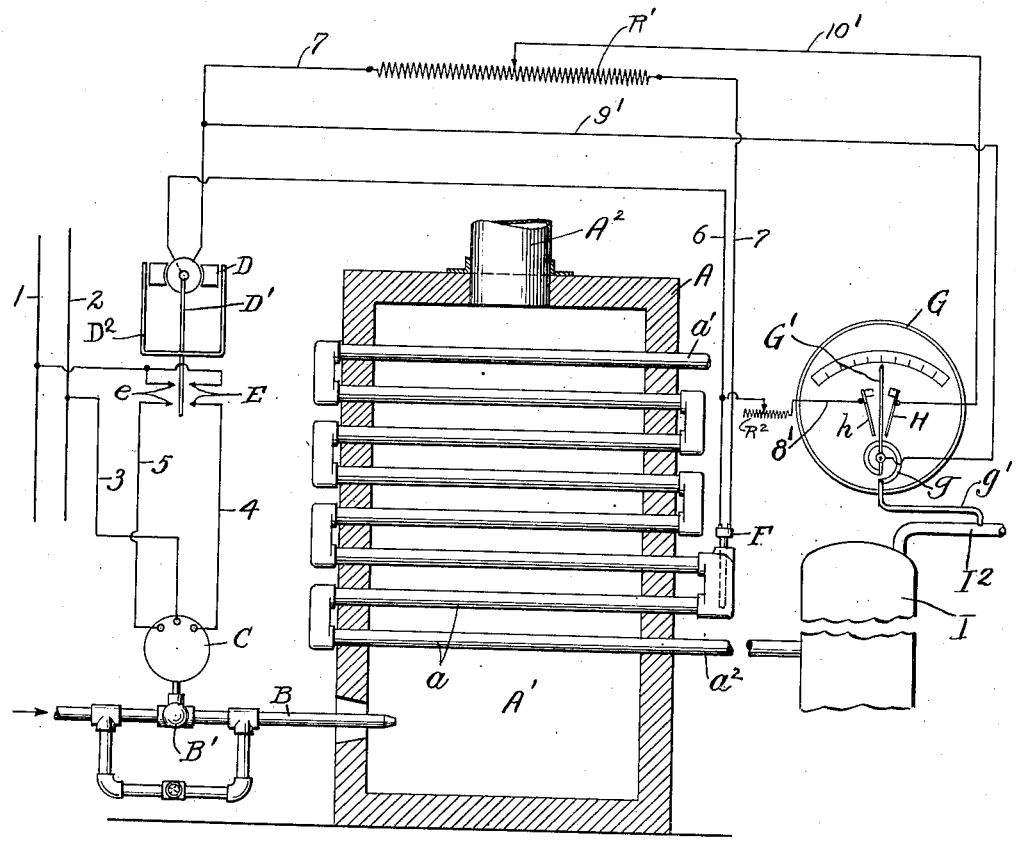

Fig. 1 of the drawings is a diagrammatic representation of oil refining apparatus provided with one form of my improved control mechanism; and Fig. 2 is a diagrammatic representation of a portion of the oil refining apparatus shown in Fig. 1, with a second form of my improved control mechanism incorporated therein.

In the drawings I have somewhat conventionally illustrated an oil preheater A, comprising a combustion chamber A' beneath a bank of tubes $a$, through which the oil to be heated passes from the heater oil inlet $a'$ to the outlet $a^2$. The latter, in the particular form of oil refining apparatus disclosed in the drawings, discharges into a shell still I, heated as by means of manually controlled fuel burners J, and provided with a bottom outlet I' for residue oil, and with an upper outlet I² for oil and vapors leading to an evaporating tower K. The latter has an outlet K' at the bottom for oil, and a vapor outlet K² at the top which leads to a bubble still L, provided in turn with a bottom outlet L' for oil, and a top outlet L² for vapors passing to condensing apparatus, (not shown). M is a pressure reducing valve at a suitable point in the path of oil flow. Oil or other fluid fuel is supplied to the combustion chamber A' of the preheater A through a burner pipe B at a rate depending on the adjustment of a fuel supply valve B'. Products of combustion after traversing the tubes a, escape from the furnace through the stack outlet A². The valve B' is adjusted by a valve actuator C, diagrammatically illustrated as a reversible motor. This valve actuator may be of known form, and in particular may be of the type shown in the Egar and Wilhjelm Patent No. 1,397,680, granted November 22, 1921. Except when the oil pressure is above or below a certain pressure range, as hereinafter explained, the actuator C is controlled by a control instrument D, diagrammatically shown as comprising a galvanometer, the pointer D' of which is periodically depressed by a depressor D². On each depression of the pointer D', when the latter is in a predetermined high position, a pair of normally separated contacts E are connected and thereby connect the terminals 3 and 4 of one winding of the reversible motor C to supply conductors 1 and 2. This causes the motor C to turn in the direction to decrease the rate at which fuel passes through the supply valve B' and burner pipe B to the combustion chamber of the furnace. When the galvanometer pointer D' occupies a low position the depression of the pointer causes normally separated contacts e to be intermittently connected. This connects the terminals 3 and 5 of the second winding of the reversible motor C to the supply conductors 1 and 2 and rotates the motor in the direction to increase the amount of fuel oil supplied to the furnace through the burner pipe B. The control instrument D may be of known form and, for example, it may be of the type shown in the Brown Patent No. 1,355,448, granted October 12, 1920. The terminals of the galvanometer are connected by circuit connectors 6 and 7 to the terminals of a thermocouple F which may be inserted in the oil outlet pipe a², or preferably as shown in the heater tube circuit a little back of the outlet pipe a². The conductor 7, as shown, includes a dead galvanometer resistance R'.

The apparatus shown in Fig. 1, in so far as it has now been specifically described, operates in a known manner to intermittently energize the motor C and thereby adjust the valve B' in one direction or the other, as required to maintain an approximately constant oil temperature at the point at which the thermocouple F is located.

The control provisions shown in Fig. 1 also include a control instrument G which, as diagrammatically illustrated, is a pressure gage comprising a Bourdon tube g, to which the pressure of the oil in the outlet from the shell still I is transmitted by a pipe g'. The Bourdon tube g is connected to a pressure indicating and switch actuating finger or pointer G' to move the latter in the clockwise or counter-clockwise direction accordingly as the pressure transmitted to the tube g rises or falls. Contacts h and H forming a part of the instrument G, mark the lower and upper limits of a range of variation in the pressure to which the instrument G is subjected which may occur without effect on the adjustment of the fuel valve B'. The limits of this pressure range may be varied by adjustment of the contacts h and H. When the pressure to which the instrument G rises to the upper limit of said range, the finger G' engages the contact H and thereby connects the motor lead 4 to the supply conductor 1 by means of a conductor 10 which connects the contact H to the motor lead 4, and a conductor 9 which connects the pointer G' to the supply conductor 1. When the pressure transmitted to the instrument G reaches the lower limit of said predetermined range of pressure variation, the pointer G' engages the contact h, and thereby connects the motor lead 5 to the supply conductor 1 by means of the conductor 9 connecting the pointer G' to supply conductor 1, and the conductor 8 connecting the contact finger h to the motor lead 5.

In the contemplated mode of operation of the apparatus shown in Fig. 1, the fuel supply valve B' for the oil preheater A is subject to the control of the galvanometer D and is adjusted by the latter as required to maintain a constant oil temperature at the point at which the thermocouple F is located, so long as the oil pressure transmitted to the instrument G is within the predetermined range in which the finger G' lies between, and does not engage either of the contacts H and h. When the pressure rises high enough to move the finger G' into engagement with the contact H, the motor C starts to adjust the valve B' in the closing direction regardless of the temperature to which the thermocouple F is then subjected. The adjustment of the valve B' thus started, continues until the valve B' reaches the limit of its closing movement, unless the oil pressure falls far enough to move the finger G' out of engagement with the contact H before such adjustment is completed. If as may well be the case, the temperature to which the thermocouple F is connected, falls so that the galvanometer pointed D' connects the contacts e, while the pointer G' is in engagement with the contact H, the second circuit of the motor C is thereby energized. This arrests or reduces, but does not reverse the motion of the motor C and merely retards the adjustment resulting from the engagement of the pointer G' with the contact H because the closure of contacts e occurs only during the periods in which pointer D' is depressed by the intermittently acting depresser D². Conversely, when the oil pressure transmitted to the tube g of instrument G falls sufficiently to move the pointer G' into engagement with the contact h, the motor C starts to open the valve B', and this adjustment continues until the valve B' is wide open, unless in the meantime the oil pressure rises and thereby moves the pointer G' out of engagement with the contact h. An increase or decrease in the temperature at which the oil leaves the preheater A tends to respectively increase or decrease the pressure at the outlet from the still I and thus restore the apparatus to the normal condition of operation in which the valve B' is controlled by the galvanometer D in response to the temperature to which the thermocouple F is subjected.

In the modified form of control apparatus shown in Fig. 2, the fuel valve actuating motor is at all times within the control of the galvanometer D, but the circuit connections between the galvanometer and the thermocouple F are changed when the pointer G' engages either of the contacts h and H. On the increase in oil pressure, which brings the pointer G' into engagement with the contact H, a portion of the galvanometer resistance R' is short circuited by a low resistance shunt about said portion comprising conductors 9' and 10', the pointer G', and the contact H. The portion of the resistance R' thus short-circuited, and consequently the effect produced, may be varied, of course, by varying the point along the length of the resistance R' at which the conductor 9' is connected thereto. On a decrease in the oil pressure transmitted to the tube g, sufficient to move the pointer G' of Fig. 2 into engagement with the contact h, a low resistance shunt is connected across the terminals of the galvanometer D. This shunt includes the conductor 9', and a conductor 8', which may include a resistance R² connecting the contact h to the conductor 6, the resistance R² preferably being adjustable.

In the operation of the apparatus shown in Fig. 2, the thermocouple F and the galvanometer of the instrument D control the operation of the valve actuator C as required to maintain an approximately constant temperature at the oil outlet so long as the pressure of the oil is such as to hold pointer G' of the instrument G in a position intermediate the positions in which it engages the contacts H and h. On an increase in the oil pressure sufficient to bring the pointer G' into engagement with the contact H, a portion of the resistance R' is in effect eliminated from the galvanometer circuit, with the result that the galvanometer then indicates a higher temperature than that to which the thermocouple is actually subjected, and in consequence adjusts the valve actuator C to make the actual oil temperature of the oil in contact with the thermocouple F lower than it is when the pointer G' is in its neutral position. Conversely, when the oil pressure decreases so that the pointer G' engages the contact h, the shunting of the galvanometer by the circuit including the conductors 8 and 9, makes the galvanometer indicate a lower temperature than that to which the thermocouple F is actually subjected, and in consequence, causes the valve actuator C to be adjusted to increase the heat supply to the preheater A, and raise the temperature of the oil leaving the preheater as is then desirable.

By means of resistances R' and R² of proper value, the controlling provisions shown in Fig. 2 may be employed to heat the oil to one predetermined temperature when the pressure of the oil is high enough to cause the pointer G' to engage the contact H, and to another predetermined temperature when the pressure of the oil is low enough to cause the pointer G' to engage the contact h, the first mentioned predetermined temperature being lower, and the second being higher than the definite temperature to which the oil is heated at the normal or intermediate oil pressures at which the pointer G' stands between the contacts H and h. Instead of the mode of operation just described, the changes in the galvanometer constant produced when a portion of the resistance R' is short-circuited and when the galvanometer is shunted as above described, may be made so relatively large that the instrument D will materially increase the heat supply in case of a drop in the oil pressure until the pressure is restored to its normal value, and will materially decrease the heat supply to the oil heater in case of an increase in oil pressure until the normal pressure is restored, without ordinarily causing the oil sweeping past the thermocouple F to reach either of said predetermined temperatures. The provisions illustrated for controlling the supply of heat to the heater A in accordance with the oil pressure, is useful not only in connection with the regular operation of oil refining apparatus, but as a safety device to cut off the supply of heat in case of fire or other abnormal condition resulting in a variation in oil pressure.

It will be apparent to those skilled in the art that the general principles of the present invention can be utilized in other ways and by means of other instrumentalities and for other purposes than those specifically described and referred to herein, and I do not wish the claims hereinafter made to be limited to the particular form of embodiment and mode of use specifically described herein, more than is made necessary by their terms and by the prior state of the art.

Having now described my invention what I claim as new and desire to secure by Letters Patent is:

1. The combination with an oil heater, of a heater regulator and means for automatically adjusting it to heat the oil to different temperatures as the pressure of the oil varies, comprising a device responsive to the temperature of the oil and a device responsive to the pressure of the oil.

2. The combination with a fluid heater, of a heater regulator and controlling provisions therefor, comprising a control instrument including a galvanometer, a thermocouple responsive to the temperature of the fluid and connected to said galvanometer, and a device responsive to the pressure of the fluid for changing the galvanometer constant on changes in the pressure of the fluid.

3. In a fluid heater, the combination with a heater regulator, of control provisions therefor, comprising a control instrument including a galvanometer, a thermocouple responsive to the temperature of the fluid heated, conductors including a resistance connecting said thermocouple to said galvanometer, a pressure gage subjected to the pressure of the fluid heated, and means whereby said gage short-circuits a regulable portion of said resistance on a decrease in the fluid pressure and on an increase in said pressure establishes a shunt about the galvanometer to divert therefrom a portion of the current flow created by the thermocouple.

4. Control apparatus, comprising a galvanometer, a thermocouple, conductors including a resistance connecting the thermocouple to the galvanometer, a fluid pressure gage, means actuated by said gage for short-circuiting said resistance on a predetermined variation in one direction of the pressure to which the gage responds, and means actuated by the gage for diverting a portion of the current flow created by the thermocouple, away from the galvanometer on a predetermined variation in the opposite direction of said pressure.

5. The combination with an oil heater, of a device for regulating the supply of heat thereto and controlling provisions for said device, comprising means responsive to the temperature to which the oil is heated and to the pressure of the oil for heating oil to a predetermined temperature when the oil is at a predetermined pressure, and for heating the oil to a temperature higher or lower than said predetermined temperature on a decrease or increase, respectively, in the pressure of the oil.

6. The combination with an oil heater, of a device regulating the supply of heat thereto, and controlling means for said device, comprising a control instrument including a galvanometer, a thermocouple responsive to the temperature of the oil heated, circuit conductors including a resistance connecting said thermocouple to said galvanometer, a pressure gage responsive to the pressure of the oil heated, and means including a contact mechanism actuated by said gage for short-circuiting said resistance on a predetermined change in one direction of the oil pressure, and for closing a low resistance shunt about the galvanometer on a predetermined change in the opposite direction of the oil pressure.

Signed at Tulsa, in the county of Tulsa, and State of Oklahoma this 29th day of June A. D., 1925.

FOSTER MALIC POOLE.